(12) United States Patent
Pan et al.

(10) Patent No.: US 7,749,292 B2
(45) Date of Patent: Jul. 6, 2010

(54) CYCLONIC DUST COLLECTING APPARATUS

(75) Inventors: Jing Liang Pan, Suzhou (CN); Bob Deng, Suzhou (CN)

(73) Assignee: Suzhou Clean Bloom Electric Co., Ltd., Suzhou (CN)

( * ) Notice: Subject to any disclaimer, the term of this patent is extended or adjusted under 35 U.S.C. 154(b) by 583 days.

(21) Appl. No.: 11/560,832

(22) Filed: Nov. 16, 2006

(65) Prior Publication Data

US 2008/0115309 A1    May 22, 2008

(51) Int. Cl.
B01D 45/12    (2006.01)

(52) U.S. Cl. .................. 55/345; 55/346; 55/459.1; 55/343; 55/348; 55/DIG. 3; 15/353

(58) Field of Classification Search .......... 55/345, 55/346, 459.1, 343, 348, 349, DIG. 3; 15/353
See application file for complete search history.

(56) References Cited

U.S. PATENT DOCUMENTS

| | | | |
|---|---|---|---|
| 3,425,192 A | 2/1969 | Norman | |
| 4,593,429 A | 6/1986 | Dyson | |
| 5,062,870 A | 11/1991 | Dyson | |
| 5,221,301 A | 6/1993 | Giuricich | |
| 5,513,418 A | 5/1996 | Weber | |
| D413,698 S | 9/1999 | Dyson | |
| 5,964,008 A | 10/1999 | Lim | |
| 5,983,449 A | 11/1999 | Thomas et al. | |
| 6,003,196 A | 12/1999 | Wright et al. | |
| 6,006,402 A | 12/1999 | Maurer et al. | |
| 6,026,540 A | 2/2000 | Wright et al. | |
| 6,070,291 A | 6/2000 | Bair et al. | |
| 6,141,826 A | 11/2000 | Conrad et al. | |
| 6,192,550 B1 | 2/2001 | Hamada et al. | |
| 6,193,787 B1 | 2/2001 | Dyson et al. | |
| 6,237,189 B1 | 5/2001 | Maurer et al. | |
| D444,275 S | 6/2001 | Mehaffey | |
| 6,260,234 B1 | 7/2001 | Wright et al. | |
| 6,261,330 B1 | 7/2001 | Dyson et al. | |
| 6,270,545 B1 * | 8/2001 | Lee et al. ................ | 55/345 |
| 6,344,064 B1 | 2/2002 | Conrad | |
| 6,353,963 B1 | 3/2002 | Bair et al. | |
| 6,357,076 B1 | 3/2002 | Lee | |
| 6,383,266 B1 * | 5/2002 | Conrad et al. ............ | 96/57 |
| 6,391,095 B1 | 5/2002 | Conrad et al. | |
| 6,401,295 B2 | 6/2002 | Bair et al. | |

(Continued)

FOREIGN PATENT DOCUMENTS

DE    10132690 A1    7/2002

(Continued)

OTHER PUBLICATIONS

European Patent Application No. EP08103715, European Search Report dated Dec. 2, 2008.

*Primary Examiner*—Jason M Greene
*Assistant Examiner*—Dung Bui
(74) *Attorney, Agent, or Firm*—Michael Fedrick; Loza & Loza, LLP (57) ABSTRACT

A dust collecting apparatus for separating particles from an airflow comprises at least a first cyclonic separator for removing larger particles from the airflow and a plurality of second cyclonic separators, arranged in parallel and in tandem with one another, for removing smaller particles.

10 Claims, 7 Drawing Sheets

U.S. PATENT DOCUMENTS

| | | | |
|---|---|---|---|
| 6,419,719 | B2 | 7/2002 | Conrad et al. |
| D462,813 | S | 9/2002 | Nakano et al. |
| 6,463,622 | B2 | 10/2002 | Wright et al. |
| 6,524,358 | B2 | 2/2003 | Yang |
| 6,613,129 | B2 | 9/2003 | Gen |
| D483,535 | S | 12/2003 | Leyden |
| 6,660,053 | B2 | 12/2003 | Oh et al. |
| 6,702,868 | B2 | 3/2004 | Oh et al. |
| D488,896 | S | 4/2004 | Leyden |
| 6,735,818 | B2 | 5/2004 | Hamada et al. |
| 6,736,873 | B2 | 5/2004 | Conrad et al. |
| 6,740,144 | B2 | 5/2004 | Conrad et al. |
| 6,746,500 | B1 | 6/2004 | Park et al. |
| D494,330 | S | 8/2004 | Downey et al. |
| D494,718 | S | 8/2004 | Rosenzweig et al. |
| D494,719 | S | 8/2004 | Rosenzweig et al. |
| 6,772,475 | B2 | 8/2004 | Weber et al. |
| 6,902,596 | B2 | 6/2005 | Conrad et al. |
| 6,910,245 | B2 | 6/2005 | Hawkins et al. |
| D517,757 | S | 3/2006 | Santiago |
| 7,014,675 | B2 | 3/2006 | Nakai et al. |
| 7,022,164 | B2 | 4/2006 | Kishkovich et al. |
| D520,692 | S | 5/2006 | Leyden |
| 7,097,680 | B2 | 8/2006 | Oh |
| 7,128,770 | B2 | 10/2006 | Oh et al. |
| 7,462,212 | B2 * | 12/2008 | Han et al. ............... 55/343 |
| 7,470,299 | B2 * | 12/2008 | Han et al. ............... 55/345 |
| 7,473,289 | B2 * | 1/2009 | Oh et al. ............... 55/318 |
| 2002/0108208 | A1 | 8/2002 | Hamada et al. |
| 2004/0045125 | A1 | 3/2004 | Park et al. |
| 2004/0205928 | A1 | 10/2004 | Alford et al. |
| 2004/0211027 | A1 | 10/2004 | Park et al. |
| 2004/0221421 | A1 | 11/2004 | Weber et al. |
| 2005/0005391 | A1 | 1/2005 | Park |
| 2005/0015921 | A1 | 1/2005 | Pullins |
| 2005/0028675 | A1 | 2/2005 | Conrad et al. |
| 2005/0050678 | A1 | 3/2005 | Oh et al. |
| 2005/0050864 | A1 | 3/2005 | Oh et al. |
| 2005/0050865 | A1 | 3/2005 | Oh et al. |
| 2005/0172586 | A1 | 5/2005 | Oh et al. |
| 2005/0125941 | A1 | 6/2005 | Joung |
| 2005/0229355 | A1 | 10/2005 | Crouch et al. |
| 2005/0251951 | A1 | 11/2005 | Oh et al. |
| 2005/0262658 | A1 | 12/2005 | Conrad et al. |
| 2006/0037172 | A1 | 2/2006 | Choi |
| 2006/0107629 | A1 | 5/2006 | Oh |
| 2006/0123590 | A1 | 6/2006 | Fester et al. |
| 2006/0137310 | A1 | 6/2006 | Conrad et al. |
| 2006/0168922 | A1 | 8/2006 | Oh |
| 2006/0168923 | A1 | 8/2006 | Lee et al. |
| 2006/0230717 | A1 | 10/2006 | Oh et al. |
| 2006/0230719 | A1 * | 10/2006 | Han et al. ............... 55/345 |
| 2006/0230721 | A1 * | 10/2006 | Oh et al. ............... 55/345 |
| 2006/0230724 | A1 * | 10/2006 | Han et al. ............... 55/345 |
| 2006/0230725 | A1 | 10/2006 | Han et al. |
| 2006/0230726 | A1 | 10/2006 | Oh et al. |
| 2006/0277874 | A1 | 12/2006 | Yoo |
| 2008/0115309 | A1 | 5/2008 | Pan et al. |
| 2008/0172994 | A1 * | 7/2008 | Courtney et al. ............... 55/345 |
| 2008/0289140 | A1 * | 11/2008 | Courtney et al. ............... 15/353 |
| 2009/0031524 | A1 * | 2/2009 | Courtney et al. ............... 15/347 |

FOREIGN PATENT DOCUMENTS

| | | |
|---|---|---|
| EP | 1676516 A1 | 7/2006 |
| EP | 1690487 A1 | 8/2006 |
| EP | 1733672 A3 | 12/2006 |
| EP | 1779761 A3 | 5/2007 |
| WO | WO 2006/008451 A1 | 1/2006 |
| WO | WO2008034325 A1 | 3/2008 |

* cited by examiner

CYCLONIC DUST COLLECTING APPARATUS

BACKGROUND

Particles, such as dirt and dust particles, can be separated from a fluid flow using a cyclonic separator. Cyclonic separators have been used in vacuum cleaners, for example, to separate dirt and dust from an air flow. Such separators can comprise relatively low efficiency cyclones for separating large particles from an air flow and higher efficiency cyclones for separating finer particles in the air flow. Such cyclonic separators have been arranged in vacuum cleaners in series, with an upstream cyclonic separator being combined with smaller downstream cyclonic separators arranged in parallel with one another. An arrangement of this type is shown and described in U.S. Pat. No. 3,425,192 to Davis.

SUMMARY

The present invention comprises a dust collecting apparatus for a vacuum cleaner. The dust collecting apparatus can separates particles, such as dirt and other particulates, from an air flow, and includes at least a first separation component for removing larger particles from the air flow and one or more second cyclonic separators for removing smaller particles. In a preferred embodiment, the second cyclonic separators are arranged both in parallel and in tandem with one another, resulting in a more compact cyclonic dust collecting apparatus having enhanced suction and dust collecting efficiency.

In one embodiment, the present dust collecting apparatus comprises an upstream cyclone in fluid communication with a source of fluid entering the apparatus; a plurality of first downstream cyclones, each being in fluid communication with the outlet of the upstream cyclone to receive a flow of air therefrom; and a plurality of second downstream cyclones each being in fluid communication with the outlet of one of the first downstream cyclones. The upstream cyclone is preferably cylindrical, and the downstream cyclones each preferably comprise a cylindrical upper portion and a frusto-conical downstream portion. The outlet of the upstream cyclone can further be provided with a grill in order to provide better particle separation. In addition, each of the first downstream cyclones is preferably adjacent to the second downstream cyclone with which it is in fluid communication, in order to provide a compact design.

The present apparatus can comprise a cylindrical housing for containing both the upstream cyclone and the downstream cyclones. Preferably, the upstream cyclone is positioned below the downstream cyclone, and the outlet or outlets of the upstream cyclone are in fluid communication with a dust collecting chamber above the upstream cyclone. In this embodiment, the downstream cyclones can be positioned such that at least a lower portion of such cyclones project through the upper end of the housing and are contained within the dust collecting chamber. The cone openings of the downstream cyclones in this embodiment are preferably arranged at approximately the same vertical height, and the outlet of the upstream cyclone is preferably positioned above the cone openings.

In another embodiment, the first and second downstream cyclones are positioned within the upstream cyclone. In this embodiment, at least a lower portion of each of the first and second downstream cyclones is positioned in an interior portion of the upstream cyclone, in order to provide a compact arrangement. The downstream cyclones can be fully contained within the upstream cyclone in this embodiment.

The present apparatus is preferably contained in a vacuum cleaner. In one such embodiment, the vacuum cleaner comprises two tanks, with the upstream cyclone contained in one tank and the downstream cyclones contained in the other tank. The vacuum cleaner can be, for example, a canister-type vacuum cleaner, an upright vacuum cleaner, or a stick vacuum cleaner. The base of each of the tanks is preferably removable to allow dust removal, although a door can alternatively be provided in the tanks for this purpose.

DRAWINGS

These and other features, aspects and advantages of the present invention will become better understood with regard to the following description, appended claims, and accompanying figures where:

All dimensions specified in this disclosure are by way of example only and are not intended to be limiting. Further, the proportions shown in these Figures are not necessarily to scale. As will be understood by those with skill in the art with reference to this disclosure, the actual dimensions of any device or part of a device disclosed in this disclosure will be determined by their intended use.

DESCRIPTION

Definitions

As used herein, the following terms and variations thereof have the meanings given below, unless a different meaning is clearly intended by the context in which such term is used.

"Communication" means fluid communication.

"Cyclone" means a vortex separator, i.e. a component of the present apparatus in which a rotating fluid flow is established to separate dust and other components of a fluid stream entering the cyclone.

"Downward" and "downwardly" mean in the direction of or toward a support surface on which the present apparatus is or can be positioned. "Upward" and "upwardly" mean in the opposite direction, i.e. away from such a support surface. "Above" refers to a position which is located upwardly with respect to a referenced component, object, or position, while "below" refers to a position which is located downwardly with respect to a referenced component, object, or position.

"Dust" refers to the solid material entrained in an air flow entering the present dust collecting apparatus, such as dirt, fiber, hair, and minute solid particles, such as particles having diameters less than 500 micrometers.

"Horizontal" refers to an orientation approximately parallel to (i.e., not substantially extending toward or away from) a support surface on which the present apparatus is supported when in use.

"Particulate" means a solid particle, such as a particle of dust or dirt. Particulates are generally suspended in air when entering the present dust collecting apparatus, and also generally have a density greater than that of air.

"Vacuum cleaner" refers to a device for removing dust and other materials by suction. Vacuum cleaners are generally portable, i.e. are designed to be moved to a location in need of dust removal, for example, and typically are designed to operate over a relatively flat surface such as a floor or a floor covering such as a rug or carpet.

"Vertical" refers to an orientation extending toward or away from a support surface on which the present apparatus is supported, preferably at an angle of about 90° with respect to the support surface.

As used herein, the term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Dust Collecting Apparatus

In order to achieve high levels of particle removal, cyclonic vacuum cleaners which are currently on the market generally incorporate a HEPA filter. Such filters are effective in removing small particulate matter from an air stream so that the air which exits a vacuum cleaner is essentially filtered. One disadvantage of using HEPA filters, however, is that they provide substantial resistance to the flow of air through a vacuum cleaner. By removing the HEPA filter from a filter assembly of a vacuum cleaner, the pressure drop experienced by air flowing through the assembly can be substantially increased and the amount of power used by the motor can be reduced, e.g. by up to 20%. However, without the HEPA filter the amount of particulate matter contained in the air stream exiting the vacuum cleaner will be increased.

The present dust collecting apparatus reduces or eliminates the need for a HEPA filter by providing improved particle separation in a compact arrangement, thereby providing vacuum cleaners which employ the present dust collecting apparatus with improved pressure drop and greater energy efficiency compared to cleaners that include HEPA filters. In the present apparatus, particles are separated from an airflow with an upstream cyclonic separator and one or more downstream cyclonic separators, the downstream cyclones preferably comprising a plurality of cyclones that are arranged in tandem and in parallel with one another. In one example, a first set of two downstream cyclonic separators operate in tandem to separate particulates from a common air stream, while one or more other sets of downstream cyclonic separators operate in parallel to the first set to separate particulates from other air streams. Such an arrangement can achieve a high separation efficiency while also allowing a compact combination of the upstream and downstream cyclonic separators so that the present apparatus can be used in a domestic vacuum cleaner.

The cyclones used in the present apparatus typically comprise a container which is cylindrical, frusto-conical, or both, within which a rotational airflow is established in order to separate heavier components of the airflow, such as dust, from the stream of air. In many of the applications for which the present dust collecting apparatus 10 is intended to be used, the fluid is air and the particles are dirt and dust, such as will be found in a domestic environment. It will be understood, however, that in some embodiments liquids can also be effectively collected with the present apparatus 10, such as in wet/dry vacuuming applications in which either solids, liquids, or both are collected with the present apparatus 10.

Upstream Cyclone

Figure 1:
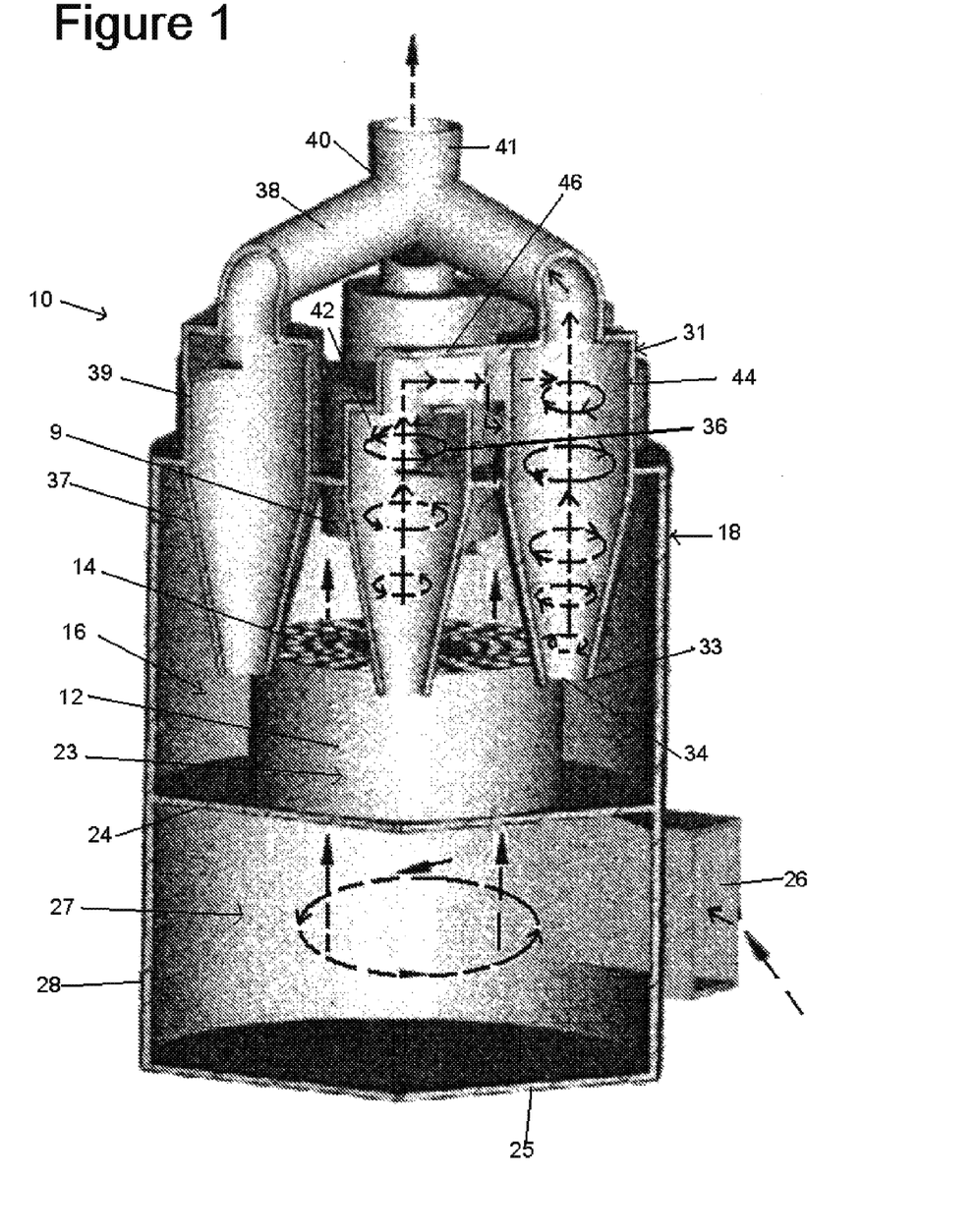
FIG. 1 is a perspective, partial cutaway view of one embodiment of the present dust collecting apparatus.
Figure 2:
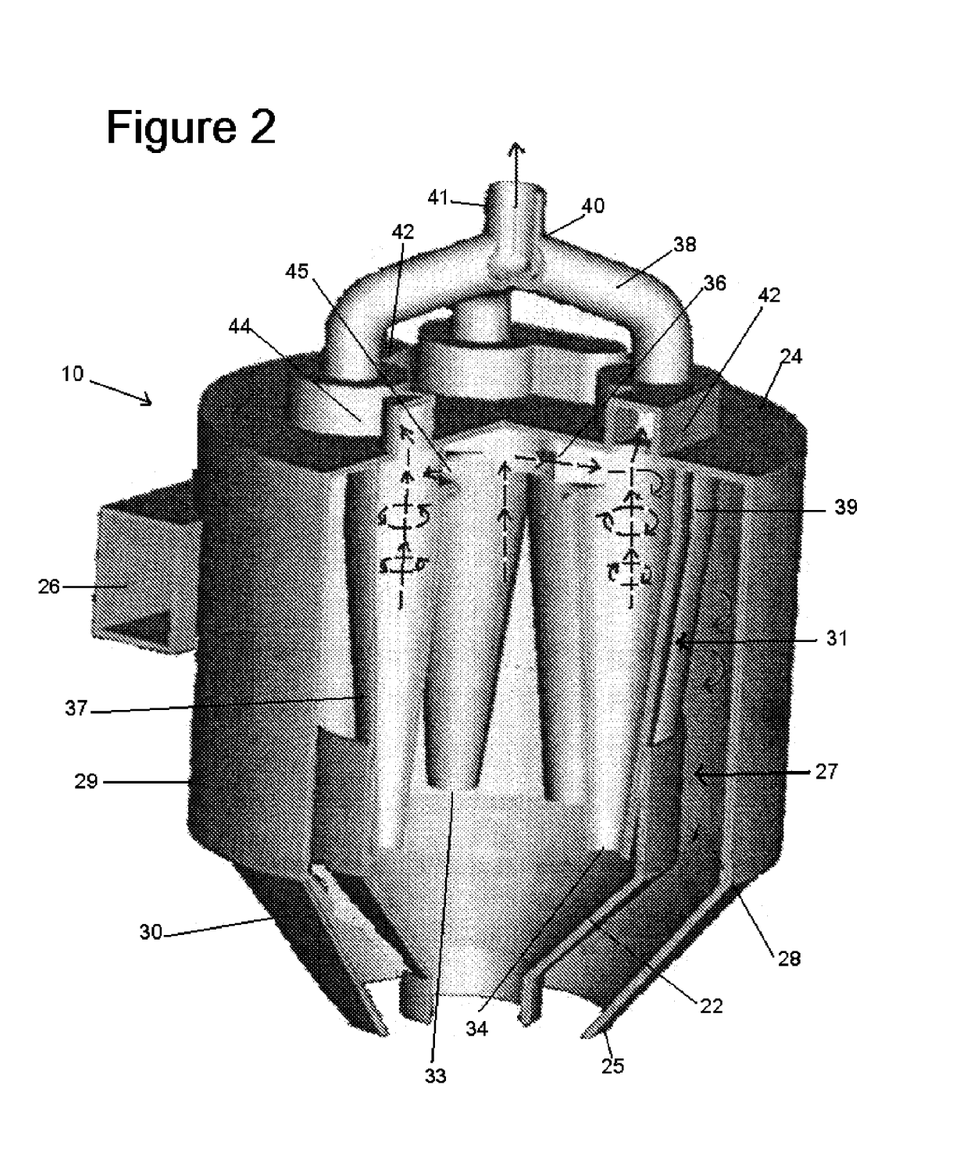
FIG. 2 is a perspective, partial cutaway view of another embodiment of the present dust collecting apparatus.

The present dust collecting apparatus 10, as described above, comprises an upstream cyclone 27 and a plurality of downstream cyclones 31. In the embodiment shown in FIGS. 1 and 2, the upstream cyclone has an upper end 24, a base 25, and a side wall 28 which extends between the upper end 24 and the base 25. The side wall 28 can be cylindrical, as in the embodiment of FIG. 1, or can also be frusto-conical or comprise a frusto-conical portion. In the embodiment of FIG. 2, side wall 28 comprises an upper cylindrical portion 29 and a lower frusto-conical portion 30, so that the upstream cyclone 27 tapers as the side wall 28 descends from the upper end 24 toward the base 25. A tangential inlet 26 is provided in the side wall 27 of the upstream cyclone 27 adjacent the upper end 24. The tangential inlet 26 is capable of delivering a particle-laden fluid to the interior of the upstream cyclone 27 in a direction which is tangential to the side wall 28 so as to set up a swirling, preferably helical flow in the interior of the upstream cyclone 27.

Figure 3A:
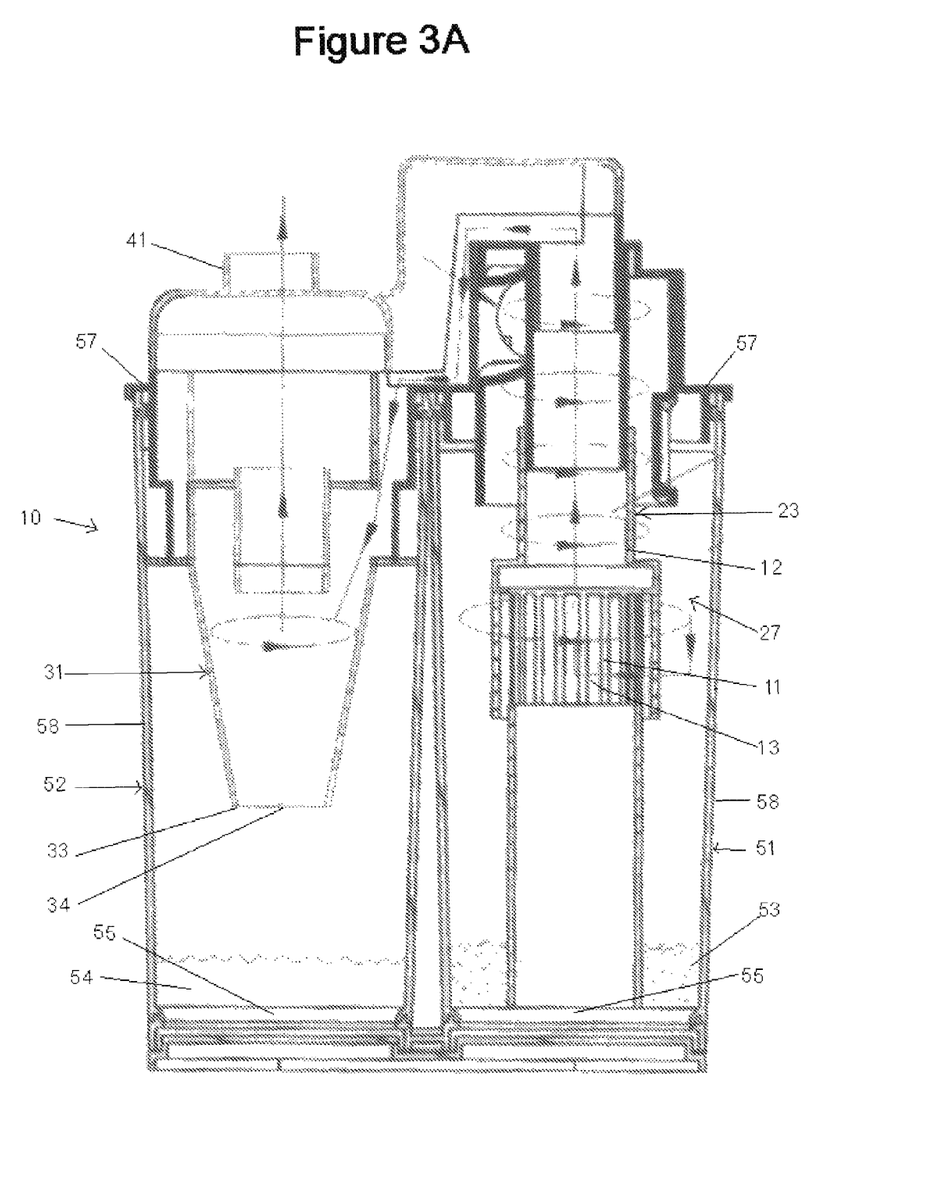
FIG. 3A is a cross-sectional view of one embodiment of the upright vacuum cleaner shown in FIG. 5 taken along line 1-1.
Figure 4A:
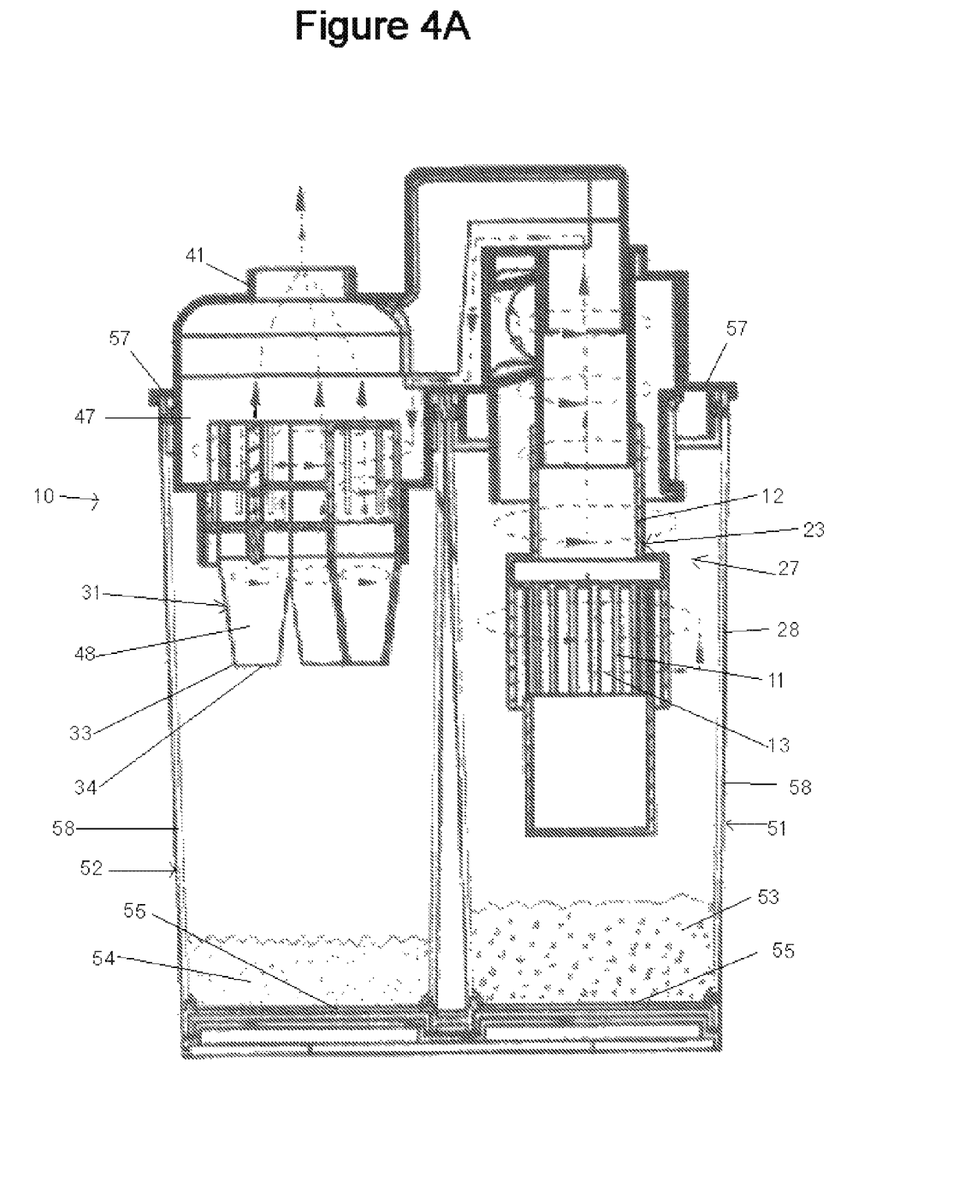
FIG. 4A is a cross-sectional view of another embodiment of the upright vacuum cleaner shown in FIG. 5 taken along line 1-1.

The upstream cyclone 27 has an outlet 23 which can be located centrally inside and/or outside of the upper end 24 and which communicates with the interior of the upstream cyclone 27. In one embodiment, the outlet 23 can comprise a conduit 12 having a peripheral grill 11 inside the upper end 24 of the upstream cyclone 27, as shown in FIGS. 3A and 4A. Grills, such as those disclosed in U.S. Pat. No. 6,702,868, can serve to exclude larger particulates and further assist in removing such particulates from the airflow entering the outlet 23 of the upstream cyclone 27. Alternatively, as in the embodiment shown in FIG. 1, the outlet 23 can comprise a generally cylindrical conduit 12 having an inlet 13 in communication with the upper end 24 of the upstream cyclone 27 and an outlet 14 which communicates with the downstream cyclones 31. In the embodiment of FIG. 1, the conduit 12 extends vertically upwardly from the upper end 24 of the upstream cyclone 27 and is covered with a cover 15 having openings which exclude larger particulates, thereby assisting in the filtration of air passing into the downstream cyclones 31. The conduit outlet 14 in this embodiment communicates with the downstream cyclones via a dust collecting chamber 16, with the outlet 14 being located above the lower end 33 of the downstream cyclones 31 in the dust collecting chamber 16.

In the embodiment of FIG. 1, the upstream cyclone 27 and the dust collecting chamber 16 are both contained by a cylindrical housing 18 within which both components are arranged. By positioning the dust collecting chamber 16 directly above the upper end 24 of the upstream cyclone 27, the present apparatus 10 can be made more compact.

An alternative compact arrangement of the upstream and downstream cyclones is shown in FIG. 2. In this embodiment, the side wall 28 of the upstream cyclone 27 is positioned around and thereby contains at least a portion of each of the downstream cyclones 31. An inner side wall 22 is positioned between the side wall 28 and a lower portion of the downstream cyclones 31, thereby separating the more particulate-laden portion of the fluid flow within the upstream cyclone 27 from the downstream cyclones 31. The inner side wall 22 extends downwardly from a point above the cone openings 34 of the frusto-conical cyclone portions 39 of the downstream cyclones 31 toward the base 25 of the upstream cyclone 27. The inner side wall also thereby helps to funnel dust exiting the cone openings 34 of the downstream cyclones 31 to a lower end of the apparatus 10. This embodiment of the present apparatus allows dust collected from both the upstream cyclone 27 and the downstream cyclones 31 to be accumulated in a common area at or adjacent to the base 25, thereby facilitating dust removal. A grill (not shown) can, in an alternative embodiment, be included in the apparatus of FIG. 2 between the top of the inner side wall 22 and the upper end 24 in order to further assist in particle separation.

Downstream Cyclones

In the present apparatus 10, an inlet conduit 36 in fluid communication with the outlet 23 of the upstream cyclone 27 communicates with one or more downstream cyclones 31. When a plurality of downstream cyclones are used in the present apparatus, as in the embodiments of FIGS. 1, 2, and 4, a plurality of inlet conduits 36 to such downstream cyclones 31 are preferably dimensioned and arranged to receive substantially equal portions of the fluid flow from the upstream cyclone 27, so as to divide the flow of air from the outlet 23 which enters each of the downstream cyclones 31 into approximately equal volumes.

In the embodiment of FIG. 1, fluid flow from the upstream cyclone 27 is directed to the downstream cyclones via an inlet 9 comprising a generally cylindrical pipe or peripheral grill that extends vertically upwardly from within the dust collecting chamber 16, though a direct connection between the outlet 23 and inlet 9 is also possible. The inlet 9 receives a flow of air exiting the upstream cyclone 27 and divides it between several joined conduits, each of which is dimensioned and arranged so as to receive a substantially equal part of any fluid flow received from the upstream cyclone 27 and to deliver such fluid portion to a downstream cyclone inlet 36.

Each downstream cyclone 31 in the present apparatus 10 is in communication with an inlet conduit 36. The downstream cyclones 31 preferably have an upper cylindrical portion 39 with which the respective inlet conduit 36 communicates in a tangential manner and a frusto-conical cyclone portion 37 which descends from the upper cylindrical portion 39. At the lower end 33 of such downstream cyclones, the frusto-conical cyclone portion 37 has a cone opening 34. As shown in FIGS. 1, 2, and 4A, the downstream cyclones 31, preferably including both upper cylindrical portions 39 and frusto-conical cyclone portions 37, are preferably arranged vertically around a longitudinal axis in a symmetrical manner. The cone openings 34 are also preferably arranged close to one another at approximately the same vertical height.

In the embodiment of FIG. 1, each of the downstream cyclones 31 passes through the upper end of the cylindrical housing, which can include apertures sized to receive the downstream cyclones 31. Each of the downstream cyclones 31 is fixed to the rim of the respective aperture in a manner which maintains a seal therebetween. As shown in FIG. 1, a portion of the upper cylindrical portion 39 of a downstream cyclone 31 is preferably positioned in the apertures.

In the alternative embodiment shown in FIG. 2, the downstream cyclones 31 project into the interior of the upstream cyclone 27. Positioning at least a lower portion of the downstream cyclones 31 in an interior portion of the upstream cyclone 27 provides for greater compactness. This arrangement is thus suitable for use in an application where dimensions are to be kept as small as possible. An example of such an application is a domestic vacuum cleaner in which consideration of size and weight are of considerable importance. Alternatively, the downstream cyclones 31 can be arranged on the outside of the upstream cyclonic separator, for example if it is desired to contain other components of a vacuum cleaner in the interior portion of the upstream cyclone 27.

Tandem Downstream Cyclones

In a preferred embodiment, each group of downstream cyclones 31 comprises a pair of cyclones 42, 44 arranged in tandem with each other. In this embodiment, the flow of air received from the upstream cyclone 27 first enters into the first paired cyclone 42 and is subjected to cyclonic separation, after which the relatively cleaned airflow flows into the second paired cyclone 44. As shown in FIGS. 1 and 2, the flow of air (shown by arrows and dotted lines) enters the first paired cyclone 42 through the inlet conduit 36, and after swirling down through the first paired cyclone 42 is drawn through a joining conduit 46 and into the inlet 45 of the second paired cyclone 44, where it is subjected to a further cyclonic separation. In this way, a stream of dirty air entering a vacuum cleaner comprising this embodiment of the present apparatus 10 will have passed through a cyclone three times, i.e. through three different cyclones (e.g., cyclones 27, 42, and 44), before reaching the downstream cyclone outlet or outlets.

The first paired cyclone 42 is preferably arranged adjacent to the second paired cyclone 44 and is aligned along a common longitudinal axis, in order to form a compact design. As shown in FIGS. 1 and 2, a plurality of such first and second paired cyclones are preferably positioned adjacent to each other and are aligned around a common longitudinal axis, preferably an axis passing through a central portion of the apparatus 10 and more preferably through the horizontal center of the apparatus 10 (e.g., the axis defined by the combined outlet 41). The plurality of first and second paired cyclones are also preferably positioned such that their cone openings 34 are aligned along a common horizontal axis, i.e. are approximately the same vertical distance from the base 25 and/or from a support surface on which the apparatus 10 is supported, facilitating the collection of dust and allowing for a compact design.

Each of the second paired cyclones 44 has an outlet conduit 38 which is preferably located centrally in the upper portion of the second paired cyclone 44. The outlet conduits 38 preferably meet at a junction 40 to form a combined outlet 41, so that air entering the apparatus 10 via the tangential inlet 26 finally leaves the apparatus via the combined outlet 41. In the embodiment of FIG. 4, each of the second downstream cyclones 48 is similarly provided with an outlet conduit 38.

Dual Barrel Design

Figure 3B:
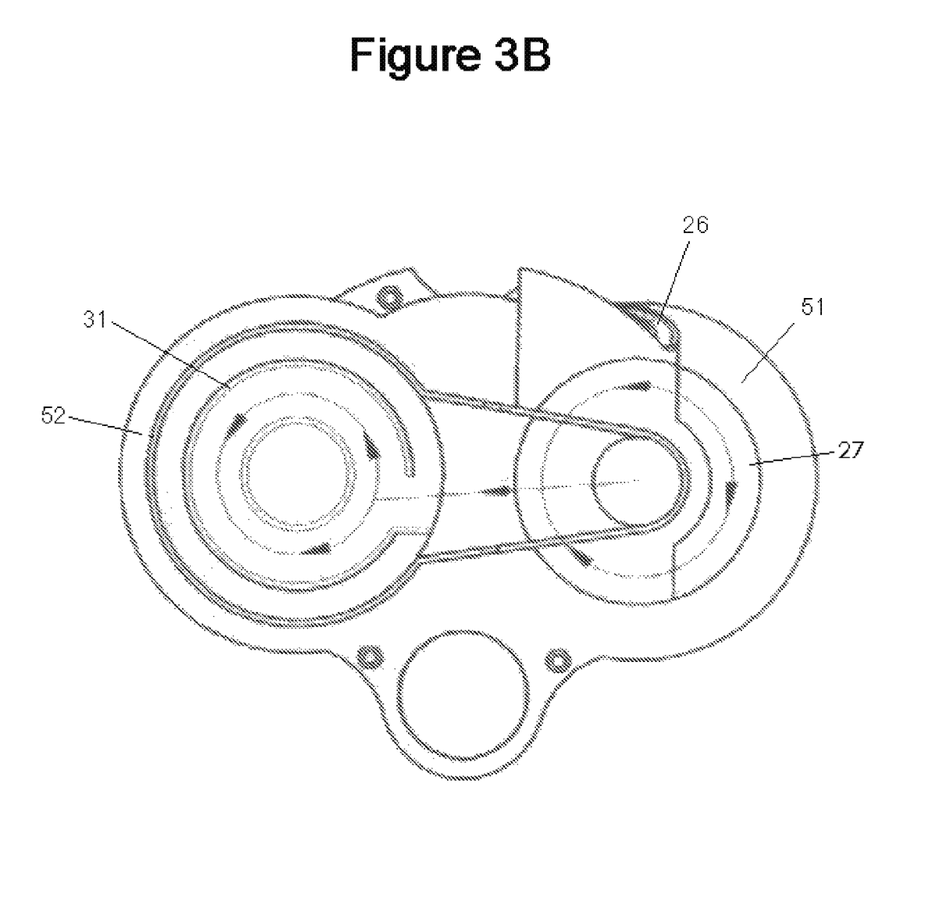
FIG. 3B is a cross-sectional view of the vacuum cleaner of FIG. 3A taken along line 2-2.

Further embodiments of the present apparatus are shown in FIGS. 3 and 4. In these embodiments, the apparatus 10 comprises a cyclonic separator having an upstream cyclone 27 in a first dust tank 51 and one or more downstream cyclones 31 in a second dust tank 52. In the first dust tank 51, relatively large particles 53 entrained within the incoming fluid flow are deposited in the lower portion of the dust tank 51. The outlet conduit 23 of the upstream cyclone 27 can be located in the lid of dual barrel of a cylinder vacuum cleaner, for example.

Figure 4B:
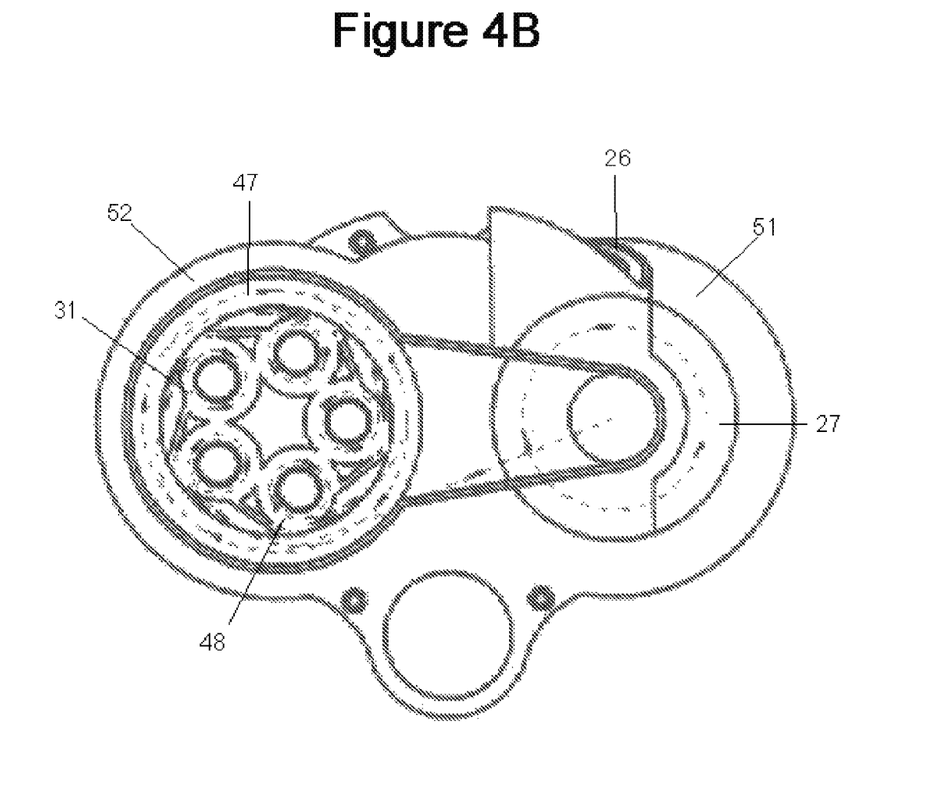
FIG. 4B is a cross-sectional view of the vacuum cleaner of FIG. 4A taken along line 2-2.

One or more downstream cyclones 31 are located in the second dust tank 52. Each of the downstream cyclones 31 has a tangential inlet opening connected with the inlet conduit 36. The downstream cyclones 31 can be arranged in the second dust tank 52 as described above, and the finer dust particles 54 can be deposited into the lower portion of the second dust tank 52. In one alternative embodiment, shown in FIG. 3A, a single downstream cyclone 31 can be used, although it is preferred that a plurality of downstream cyclones 31 be used, as shown in FIGS. 1, 2, and 4. In the embodiment shown in FIGS. 4A and 4B, a first, preferably cylindrical downstream cyclone 47 receives a fluid flow from the upstream cyclone 27, and after undergoing cyclonic separation of particles in the first downstream cyclone the fluid flow is distributed to a plurality of second, preferably frusto-conical downstream cyclones 48 positioned within the cylindrical cyclone 47, as in the embodiment of FIG. 2.

Figure 5:
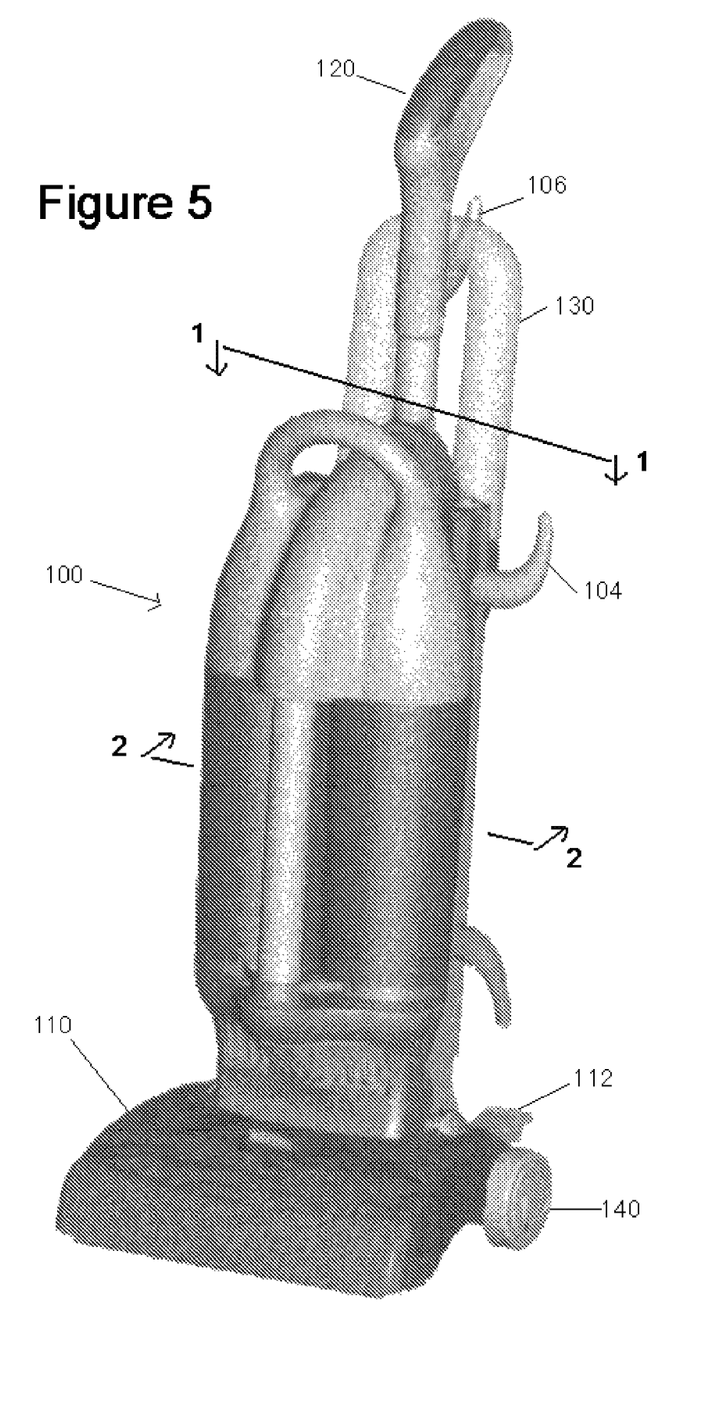
FIG. 5 is a perspective view of a vacuum cleaner according to the present invention.

Each of the first and second dust tanks comprises a base 55, a top 57, and one or more sidewalls 58, and the two dust tanks are preferably arranged adjacent to each other (side by side) in a vacuum cleaner. FIG. 5 illustrates an embodiment in which two dust tanks are provided in this way in an upright vacuum cleaner. The two tanks each preferably have a separate top, base and sidewall, with the base preferably being removable to allow for dust removal. Alternatively, a common base can be used for the two dust tanks to facilitate the removal of dust from both tanks.

Operation

The flow of fluid through the present apparatus is illustrated in FIGS. 1-4B with arrows. A fluid flow in which particles are entrained enters the present apparatus 10 via the tangential inlet 26. The orientation of the tangential inlet 26 cause the fluid flow to follow a helical path within the upstream cyclone 27 so that the fluid flow travels downwardly towards the base 25. Relatively large particles 53 entrained within the incoming fluid flow are deposit in the lower portion of the interior of the upstream cyclone 27 adjacent the base 25. The fluid flow, in which smaller particles remain entrained, then moves inwardly and upwardly towards the upper end 24 of the upstream cyclone 27. The fluid flow exits the upstream cyclone 27 via the outlet 23 along which the fluid flow travels until it reaches the one or more downstream cyclones 31. In the embodiments of FIGS. 1, 2, and 4, the fluid flow is then divided into separate fluid flows, for example into five separate fluid flows in the embodiment of FIG. 4. When each portion of the fluid flow reaches the upper cylindrical portion 39 of a downstream cyclone 31, such as a respective first paired cyclone 42, it again follows a helical path therein in view of the tangential orientation of the inlet conduit 36. The separated fine particles 54 are deposited below the cone openings 34 of the downstream cyclones 31, for example in the second dust tank 52 in the embodiments of FIGS. 3 and 4, while the remainder of the fluid leaves the final downstream cyclone 31. The separate fluid flows from each downstream cyclone 31 or set of paired cyclones 42, 44 are combined at the junction 40 and leave the apparatus via the combined outlet 41.

Vacuum Cleaners

The present dust collecting apparatus can be included in a variety of different vacuum cleaners known to the art. In a preferred embodiment, shown in FIG. 5, the present dust collecting apparatus comprises two dust tanks, as in the embodiments of FIGS. 3 and 4, and is included in an upright vacuum cleaner 100. The upright vacuum cleaner 100 illustrated in FIG. 5 comprises an articulating cleaner head 110 which can articulate from an upright resting position to an operating position in which the handle 120 is lowered with respect to the resting position of the handle 120 by means of a control lever 112. The cleaner head 100 includes an opening for receiving a dust-laden airflow, which travels through a conduit such as the flexible conduit 130 having an outlet in communication with the inlet 26 of the upstream cyclone 27 of the present dust collecting apparatus 10. The upright vacuum cleaner 100 also preferably includes wheels 140 on either lateral side of the cleaner head 110 to facilitate movement of the vacuum cleaner 100 across a surface, as well as other components typically included in upright vacuum cleaners such as electrical cord hooks 104 and a hook 106 for the flexible conduit 130.

The present dust collecting apparatus can also be used in other types of vacuum cleaners known to the art, such as stick vacuum cleaners, which operate via a handle like upright vacuum cleaners but do not have a cleaner head that articulates. The present dust collecting apparatus can also be used in a canister-type vacuum cleaner, in which the cleaner head generally comprises a rigid wand and is connected to the dust collecting apparatus and other powered components of the vacuum cleaner via a flexible hose or other conduit. Alternatively, the present dust collecting apparatus can be incorporated into a stationary vacuum cleaner system and connected to one or more locations via fixed conduits.

In all vacuum cleaner applications, the apparatus 10 will require periodic emptying of separated particles, i.e. dust. One way to accomplish this can be to arrange for the base 25 to be made removable from (i.e., reversibly secured to) the side wall 28 for emptying purposes. Alternatively, a door can be provided in sidewall 28 in order to access dust collected in the apparatus 10, such as in the dust collecting chamber 16 and/or in the upstream cyclone 27 in the embodiment of FIG. 1.

Although the present invention has been discussed in considerable detail with reference to certain preferred embodiments, other embodiments are possible. The steps disclosed for the present methods are not intended to be limiting nor are they intended to indicate that each step depicted is essential to the method, but instead are exemplary steps only. Therefore, the scope of the appended claims should not be limited to the description of preferred embodiments contained in this disclosure. All references cited herein are incorporated by reference to their entirety.

What is claimed is:

1. A dust collecting apparatus, comprising:
a) a cylindrical housing comprising an upstream cyclone having an inlet, an outlet, an upper end, a base, and a side wall, wherein the inlet of the upstream cyclone is provided in the side wall and is in fluid communication with a source of fluid entering the apparatus;
b) a plurality of first downstream cyclones each having an inlet and an outlet, the first downstream cyclones being arranged about a longitudinal axis, wherein the inlet of each of the first downstream cyclones is in fluid communication with the outlet of the upstream cyclone to receive a flow of fluid therefrom; and
c) a plurality of second downstream cyclones each having an inlet and an outlet, wherein the inlet of each of the second downstream cyclones is in fluid communication with the outlet of one of the first downstream cyclones, and wherein each of the second downstream cyclones is positioned adjacent to the first downstream cyclone with which it is in fluid communication and is in alignment with the longitudinal axis
d) a dust collecting chamber within the cylindrical housing in communication with the first and second downstream cyclones, the dust collecting chamber being positioned above the upstream cyclone,
wherein the outlet of the upstream cyclone comprises a conduit extending upwardly from the upper end of the upstream cyclone into the dust collecting chamber, the conduit extending above lower cone openings of each of the first and second downstream cyclones, wherein the conduit is covered with a cover having openings which exclude particulates larger than a predetermined size.

2. The apparatus of claim 1, wherein the lower cone openings of the first and second downstream cyclones are arranged at approximately the same vertical height.

3. The apparatus of claim 1, wherein at least a lower portion of each of the first and second downstream cyclones is positioned in an interior portion of the upstream cyclone.

4. The apparatus of claim 1, wherein the apparatus is contained in a vacuum cleaner.

5. The apparatus of claim 4, wherein the vacuum cleaner comprises two tanks, and wherein the upstream cyclone is contained in a first tank and the downstream cyclones are contained in the second tank.

6. The apparatus of claim 1, wherein the vacuum cleaner is selected from the group consisting of a canister-type vacuum cleaner, an upright vacuum cleaner, and a stick vacuum cleaner.

7. The apparatus of claim 1, wherein the base is reversibly secured to the apparatus in order to allow dust removal.

8. The apparatus of claim 1, wherein the side wall of the upstream cyclone further comprises a door to allow dust removal.

9. The apparatus of claim 1, wherein the outlet of the upstream cyclone further comprises a grill.

10. The apparatus of claim 1, wherein each of the downstream cyclones comprise a cylindrical upper portion and a frusto-conical downstream portion.

* * * * *